United States Patent
Chen et al.

(10) Patent No.: US 12,089,541 B2
(45) Date of Patent: Sep. 17, 2024

(54) CULTIVATION METHOD FOR DRIP IRRIGATION OF COTTON FIELDS IN SALINE-ALKALI SOIL

(71) Applicants: Cotton Research Institute, Xinjiang Academy Agricultural and Reclamation Science, Shihezi (CN); Water Conservancy and Construction Institute, Xinjiang Shihezi Vocational College, Shihezi (CN); Institute of Agricultural Science and Technology of Third Div., Xinjiang Production and Construction Corps, Tumushuker (CN)

(72) Inventors: Bing Chen, Shihezi (CN); Yu Yu, Shihezi (CN); Zongming Xie, Shihezi (CN); Jing Wang, Shihezi (CN); Xianhui Kong, Shihezi (CN); Hai Lin, Shihezi (CN); Qiong Wang, Shihezi (CN); Gang Wang, Shihezi (CN); Xin Wang, Shihezi (CN); Taijie Liu, Shihezi (CN); Jianqiang Cui, Tumushuker (CN); Donghai Zhang, Tumushuker (CN); Xiaofeng Peng, Tumushuker (CN); Fangyong Wang, Shihezi (CN); Huanyong Han, Shihezi (CN); Jihai Fu, Shihezi (CN)

(73) Assignees: Cotton Research Institute, Xinjiang Academy Agricultural and Reclamation Science, Shihezi (CN); Water Conservancy and Construction Institute, Xinjiang Shihezi Vocational College, Shihezi (CN); Institute of Agricultural Science and Tech. of Third Div., Xinjiang Product. and Construction Corps, Tumushuker (CN)

(*) Notice: Subject to any disclaimer, the term of this patent is extended or adjusted under 35 U.S.C. 154(b) by 0 days.

(21) Appl. No.: 18/122,668

(22) Filed: Mar. 16, 2023

(65) Prior Publication Data

US 2023/0292682 A1    Sep. 21, 2023

(30) Foreign Application Priority Data

Mar. 18, 2022  (CN) ......................... 202210270070.3

(51) Int. Cl.
*A01G 22/50*  (2018.01)
*A01B 49/06*  (2006.01)
*A01B 79/02*  (2006.01)
*A01C 23/04*  (2006.01)
*A01G 13/02*  (2006.01)
*A01G 25/02*  (2006.01)
*A01G 25/16*  (2006.01)

(52) U.S. Cl.
CPC .............. *A01G 22/50* (2018.02); *A01B 79/02* (2013.01); *A01C 23/042* (2013.01); *A01G 25/02* (2013.01); *A01G 25/16* (2013.01); *A01B 49/06* (2013.01); *A01G 13/0275* (2013.01)

(58) Field of Classification Search
CPC ........ A01G 22/50; A01G 25/02; A01G 25/16; A01G 13/0275; A01B 79/02; A01B 49/06; A01C 23/042
See application file for complete search history.

(56) References Cited

FOREIGN PATENT DOCUMENTS

| CN | 101293253 A | * 10/2008 | .............. B09C 1/02 |
|---|---|---|---|
| CN | 108934262 A | * 12/2018 | ............. A01B 79/02 |
| CN | 112314377 A | 2/2021 | |

OTHER PUBLICATIONS

Translation: CN 101293253 A.*
Translation: CN 108934262 A.*
CNIPA, Notification of First Office Action for CN202210270070.3, Sep. 27, 2023.
CNIPA, Notification to grant patent right for invention in CN202210270070.3, Feb. 29, 2024.
Mao zuolin et al., Dry sowing and wet extraction technology for cotton planting in Aksu saline alkali land, Rural Science & Technology, Dec. 2020, pp. 19-21, issue 6.
Xu Wenxiu et al., Agronomic overview, Mar. 2018, p. 188, China agricultural university press.
Mn Feihu et al., Fertilization techniques theory and practice with drip irrigation, Dec. 2013, pp. 180-195, science and technology of China press.

* cited by examiner

*Primary Examiner* — Tara Mayo
(74) *Attorney, Agent, or Firm* — Hemisphere Law, PLLC; Zhigang Ma

(57) ABSTRACT

A cultivation method for drip irrigation of cotton fields in saline-alkali soil is provided, belonging to the field of agricultural planting technologies. It mainly includes performing land preparation; setting a planting mode; laying tubes; performing a high frequency drip irrigation; fertilizing with water; performing intertillage; performing chemical control; and performing green prevention and control.

3 Claims, No Drawings

CULTIVATION METHOD FOR DRIP IRRIGATION OF COTTON FIELDS IN SALINE-ALKALI SOIL

TECHNICAL FIELD

The disclosure relates to the field of agricultural planting technologies, particularly to a cultivation technology of cotton crops, and more particularly to a high-efficiency cultivation method for high-frequency drip irrigation, water saving, seedling survival and strengthening, and yield increase of cotton fields in saline-alkali soil.

BACKGROUND

The area of saline-alkali soil in the world is about 1 billion hectares, accounting for more than ⅓ of the land area, with an annual growth rate of 1-1.5 million hectares. It is estimated that the salinization of cultivated land will reach 50% by 2025. The area of saline-alkali soil in China is about 1 billion mu (fifteen mu is equal to one hectare), and it is widely distributed. There are also potential secondary saline-alkali lands. The most serious areas of China, such as Xinjiang, account for about ⅓ of the saline-alkali land in China, and more than ⅔ of the cultivated land in the whole region of Xinjiang have different degrees of salinization. Planting crops in saline-alkali soil will seriously affect the emergence and survival of seedlings, and ultimately affect the yield and quality of crops. If the saline-alkali land can be improved, especially the saline-alkali in the existing cultivated land, and the harm of saline-alkali to crops can be reduced, the agricultural development will have a larger growth space.

Cotton is not only an important field economic crop, but also an important strategic material, which plays an important role in national economy and national security of China. Cotton is a saline-alkali tolerant crop, which can survive in light and moderate saline-alkali environment, usually within 0.5%, and its saline-alkali tolerance is different at different growth periods. The greater the cotton is, the stronger the saline-alkali tolerance (resistance) is. If the emergence rate and rate of strengthen seedling are improved by certain measures at the time of emergence and seedling, the tolerance (resistance) of cotton to saline-alkali is enhanced after the bud stage, and there is still a high yield. In order to promote the seedling formation of cotton in saline-alkali soil, the irrigation before sowing of cotton in most cultivated land mostly adopts the way of irrigation in autumn and winter of last year or spring irrigation in spring of next year, which consumes a lot of agricultural water, resulting in the shortage of agricultural water in spring. There are also problems such as incapability of flexibly mastering the sowing period, poor seedling emergence of cotton seedlings after sowing, the easy return of salt in the soil to harm seedling formation, the leaching of soil nutrients, the increase of manpower and material investment and the like. Therefore, it is necessary to innovate the corresponding cultivation technology of water-saving, seedling emergence and survival of seedlings in saline-alkali land in production to alleviate the above problems in the prior art.

SUMMARY

A purpose of the disclosure is to provide a cultivation method for saving water, protecting seedlings and increasing yield of cotton in saline-alkali soil (also referred to as saline-alkali land), solving the defects of the prior art such as large water consumption, slow emergence, low emergence rate, and low survival rate of seedlings of cotton field in saline-alkali soil, which improves the soil microenvironment, land preparation quality and sowing quality of the cotton field of saline-alkali soil, saving irrigation water, increases seedling emergence rate and survival rate of seedlings, improves the saline-alkali resistance of cotton seedlings, and improves the yield, so as to achieve the purpose of high-efficiency cultivation of cotton planting in saline-alkali soil with water-saving and high survival rate of seedlings.

The disclosure discloses a high-efficiency cultivation method suitable for high-frequency drip irrigation, water saving, seedling survival and strengthening, and yield increase of cotton fields in saline-alkali soil, mainly including the following steps:

(1) performing land preparation, wherein a plow depth is greater than 28 centimeters (cm) every year, and a subsoiling depth is required to be in a range of 35-50 cm with a frequency of once every 3-5 years, and the quality of land preparation reaches the standard of "flat, broken, clean, neat and solid";

(2) setting a planting mode, wherein the planting mode includes 6 seeds rows per film, one plant per hole, spacing configuration with a wide row spacing 63 cm and a narrow row spacing 13 cm, or a wide row spacing 64 cm and a narrow row spacing 12 cm, and 9.5-10 cm of a hole spacing within each of the seed rows;

(3) laying drip irrigation capillary tubes, including: laying the drip irrigation capillary tubes under the film with three drip irrigation capillary tubes per film to ensure the quality of the drip irrigation capillary tubes and enough water; wherein each of the drip irrigation capillary tubes is laid in a middle of two rows of the seed rows, when the dripper is disposed on one side of the drip irrigation capillary tube, the dripper faces downward and faces an outer row of the two rows of the seed rows, when the dripper is in a middle of the drip irrigation capillary tube, the dripper faces upward, or the drip irrigation capillary tube is laid beside an inner row of the two rows of seed rows and the dripper faces downward and faces the outer row with a distance of 7 cm from the inner row and within 20 cm from the outer row;

(4) performing a high frequency drip irrigation mode, including: dripping water for seedling emergence once within 48 hours after sowing under a condition of avoiding rainy weather with no irrigation and no ridges of field before sowing, wherein a water volume is in a range of 10-15 $m^3$/mu (fifteen mu is equal to one hectare) and there is water in each seed hole, stopping drip irrigation immediately when the water in the two adjacent seed holes is just communicated; dripping the water for seedling emergence again when saline-alkali return occurs in the seed holes after 5-6 days of the dripping water for seedling emergence once within 48 hours after sowing, with a water volume of 10-20 $m^3$/mu, and waiting for seedling emergence; dripping water for seedling survival once 5-7 days after the seedling emergence with a water volume of 10-15 $m^3$/mu; dripping the water for seedling survival again after another 5-7 days with a water volume of 10-15 $m^3$/mu, wherein the water volume and times of the dripping can be increased 1-2 times according to specific situations, until water irrigation is prepared in early June;

(5) fertilizing with water, including: adding a saline-alkali soil amendment every time when dripping the water for seedling emergence, adding 3-5 kg/mu of the saline-alkali soil amendment for a first time of dripping the water for seedling survival with adding 0.5-2 kg/mu of potassium dihydrogen phosphate and 100-200 g/mu of zinc fertilizer, and adding 3-5 kg/mu of the saline-alkali soil amendment every time after the first time of dripping the water for seedling survival to thereby improve soil microenvironment and increase fertilizer requirement of cotton seedlings; and (6) performing intertillage, including: performing the intertillage once after seedling rows are presented, and performing the intertillage timely after rain and at low temperature, wherein 3-4 times of the intertillage are performed after the sowing and before budding, with a depth of 10-22 cm, and an anti-pressure arched steel plate can be carried with an intertillage vehicle to prevent damaging the straight drip irrigation capillary tubes.

In an embodiment, the planting mode is specifically as follows: a width of the film is 2.05 m, six rows of the seeds are sown, an average row spacing of the seed rows is 38 cm, a cotton hole spacing is in a range of 9.5-10 cm, precision seeding is performed with one seed per hole, and one seedling per hole.

In an embodiment, the saline-alkali soil amendment is at least one of Jiandifeng compound fertilizer, humic acid soil amendment, and Feidigai compound fertilizer.

In an embodiment, the amount of the potassium dihydrogen phosphate is 1 kg/mu, and the amount of the zinc fertilizer is 200 g/mu.

In an embodiment, the key process further includes chemical control, including:

performing a first chemical control after the cotton seedlings are exposed and the soil is sealed to prevent high seedlings by spraying 0.5-1 g/mu of mepiquat chloride according to variety characteristics and weather; performing a second chemical control at a three-leaf stage of the cotton seedlings by spraying 1-2 g/mu of mepiquat chloride; and performing a third chemical control according to the growth condition of the cotton seedlings after the cotton seedlings entered the bud stage by spraying 3-5 g/mu of mepiquat chloride.

In an embodiment, before the water irrigation, green prevention and control is a main task, and specific operations of the green prevention and control of diseases, pests and weeds are as follows:

blocking timely the edge of the field before sowing, drying and coating seeds, spraying the soil with herbicides to fully protect predatory natural enemies, hanging yellow sticky cards, blue sticky cards, insecticidal lamps, and syrup bottles, and pulling weeds manually and other green prevention and control methods to preliminarily control the diseases, the pests and the weeds.

In an embodiment, specific operations of the intertillage are as follows: a tillage depth of a first intertillage is in a range of 10-12 cm, and a seedling protection zone is 10 cm; after the first intertillage, the tillage depth is increased by 3-5 cm each time until the tillage depth is increased to 22 cm, the seedling protection zone is kept at about 8 cm. Generally, 4-5 times of the intertillage are carried out.

Compared with the prior art, the disclosure has the following beneficial effects:

(1) The traditional method of planting cotton in saline-alkali land is irrigation in autumn and winter or spring before sowing, and the irrigation amount per mu is about 150-200 m$^3$. Before irrigation, it is necessary to make ridges of field, and after irrigation, it is necessary to demolish and level the ridges of field. The method of the disclosure does not carry out irrigation in autumn and winter or spring before sowing, which saves nearly ⅓ of water consumption, there is also no need to make, demolish and level the ridges of field, thus reducing the investment of manpower and material resources such as artificial irrigation, ridge making and the like before sowing.

(2) The traditional method of land preparation before cotton planting in saline-alkali soil is to plow the soil at a plow depth of more than 28 cm per year without subsoiling, and the quality of land preparation reaches the standard of "flat, moisture, broken, clean, neat and loose". The land preparation method before sowing of the disclosure is to plow the soil with a plow depth is more than 28 cm per year, the subsoiling is conducted once every 3-5 years with a subsoiling depth of 35-50 cm, and the quality of the land preparation reaches the standard of "flat, broken, clean, neat and solid". The subsoiling process is added, the plow bottom of the soil is broken, and the internal environment of the saline-alkali soil is improved. The quality of land preparation has removed the standard of "moisture and loose" and added the standard of "solid", which not only prolongs the suitable sowing period, but also overcomes the phenomenon of slow emergence, and incomplete and uneven emergence caused by different sowing depths.

(3) The traditional cotton field configuration mode in saline-alkali soil is one film with six rows, spacing configuration with a wide row spacing 66 cm and a narrow row spacing 10 cm, 9.5 cm plant spacing (also referred to as hole spacing), single or multiple seed precision sowing, the spacing of narrow rows is relatively narrow, and the seeder is duck-mouth-like shaped that is easy to puncture the drip irrigation capillary tubes. The method of the disclosure has six rows per film, one plant per hole, spacing configuration with a wide row spacing 63 cm and a narrow row spacing 13 cm, or a wide row spacing 64 cm and a narrow row spacing 12 cm, 9.5-10 cm of a hole spacing within each row, and an average row spacing of 38 cm, which does not affect the mechanical harvesting, increases the narrow row spacing, provides a large space for the drip irrigation capillary tubes to be arranged in the middle, and also avoids the phenomenon that the drip irrigation capillary tubes are easily punctured by the duck-mouth-like shaped seeder due to the spacing of narrow rows is relatively narrow.

(4) The traditional method of tube laying in cotton planting in saline-alkali soil is one film with six rows, one tube for every two rows of seed rows, and narrow rows of the seed rows in the film are laid with the tube in the middle or side; or one tube for every three rows of seed rows and one drip irrigation tube is arranged between the wide rows of the seed rows. However, the direction of the dripper of each drip irrigation capillary tube towards the seed row is different in different methods of tube laying. Although the drip irrigation capillary tube is laid in the center of the narrow row, the dripper is not strictly laid in the center, the water and fertilizer stay unevenly, and the length of cotton seedlings in six rows is inconsistent, which is difficult to manage and affects the final yield. In the method of the disclosure, the drip irrigation capillary tubes are laid under the film. Each of the drip irrigation capillary tubes is laid in the middle of two rows of seed rows, with the dripper facing the center. If the dripper of the drip irrigation capillary tube is disposed on one side of the tube, the dripper faces downward and faces the outer row, if the dripper is in the middle of the tube, the dripper faces upward and directly faces the center. Three drip irrigation capillary tubes in one film can ensure the quality of drip irrigation capillary tubes and sufficient water consumption. The position of the dripper is in the center, the distance from each row of seed rows is consistent, the water and fertilizer stay evenly, the utilization rate is high, the water and fertilizer consumption is reduced by about 1/10, the seeds germinate quickly, the seedlings emerge quickly and uniformly, the growth of each row after seedling emergence is consistent, the management is easy, and the yield can be improved.

(5) The traditional irrigation methods for cotton planting in saline-alkali soil include broad irrigation of 150-200 m$^3$/mu after harvest or before sowing, no irrigation during the sowing stage and seedling stage until early June water irrigation is carried out, or performing dry seeding and wet emergence with once drip irrigation after sowing and before seedling emergence, 25-35 m$^3$/mu, no irrigation at the seedling stage until early June the water irrigation is carried out. In the high frequency drip irrigation method of the disclosure, irrigation is not carried out before sowing, the water for seedling emergence is dripped once within 48 hours after sowing, rainy weather is avoided, and the water volume is 10-20 m$^3$/mu (less than 10 m$^3$/mu for cohesive saline-alkali soil, about 12 m$^3$/mu for loamy saline-alkali soil, and about 15 m$^3$/mu for sandy saline-alkali soil). If there is saline-alkali return phenomenon in the seed hole after 5-6 days of the drip irrigation, the water for seedling emergence is dripped with the same water volume as above for 1-2 times. 5-7 days after the emergence of seedlings, the water for the survival of seedlings is dripped once with the water volume of 10-15 m$^3$/mu (less than 10 m$^3$/mu for cohesive saline-alkali soil, about 12 m$^3$/mu for loamy saline-alkali soil, and more than 15 m$^3$/mu for sandy saline-alkali soil). After another 5-7 days, the water is dripped again with the same water volume as above. The water volume can be increased and drip irrigation times can be increased 1-2 times according to the specific situation, until the water irrigation is prepared in early June, and thus the water for seedling survival of is dripped 2-3 times. The water is dripped for 3-5 times before the formal water irrigation (i.e., broad irrigation), the water for seedling emergence is increased for one time, and the water for the seedling survival is increased for 2-3 times. The total water consumption is 40-60 m$^3$/mu, and the water is saved by 90-140 m$^3$/mu relative to broad irrigation.

(6) The traditional fertilization process of cotton planting in saline-alkali soil before budding (i.e., before water irrigation) includes applying bottom fertilizer or no fertilizer before sowing, no fertilizer for autumn and spring irrigation or dripping water for seedling emergence, or applying a small amount of fertilizer such as urea, and it is not until the beginning of June that a large amount of fertilization is applied after the water irrigation is prepared. In the method of the disclosure, the fertilizer is applied with water before budding. 3-5 kg/mu of saline-alkali soil amendment is added when the water for seedling emergence is dripped for 1-2 times, 3-5 kg/mu of the saline-alkali soil amendment (e.g., Jiandifeng compound fertilizer) is added when the water for seedling survival is dripped for 2-3 times with 0.5-2 kg/mu of potassium dihydrogen phosphate and 100-200 g/mu of zinc fertilizer. The saline-alkali soil amendments are added to the drip before and after seedling emergence, and phosphorus, potassium and zinc fertilizers are added after seedling emergence, which improves the soil saline-alkali environment and increases soil fertility after seedling emergence.

(7) In traditional cotton planting in saline-alkali soil, there is no intertillage or a small amount of 1-2 times of intertillage at seedling stage, the depth is about 15 cm, and there is no pressure-proof device for intertillage drip irrigation regions. In the method of the disclosure, during the seedling stage, the intertillage is carried out after the seedling rows are presented, and the intertillage is also carried out timely after rain and at low temperature. The intertillage is carried out 3-4 times after sowing and before budding, with a depth of 10-22 cm. In order to prevent damaging the straight drip irrigation tubes, the anti-pressure arched steel plate is carried with the machine, which increases the number of times of intertillage by 1-2 times and reduces the rolling loss of drip irrigation regions by intertillage.

Compared with the prior art, the cultivation method provided by the disclosure effectively solves many defects of the prior art, improves the microenvironment of saline-alkali soil, the quality of land preparation, the quality of cotton seeding, saves irrigation water, speeds up the seedling emergence, increases the seedling emergence rate, and improves the seedling survival rate, so as to achieve the goal of high-efficiency cultivation of saline-alkali soil cotton fields with water saving, rapid emergence and seedling strengthening, and high seedling survival rate.

DETAILED DESCRIPTION OF EMBODIMENTS

In order to make the purpose, technical solutions and advantages of the disclosure clearer, the technical solutions of the disclosure will be described clearly and completely below. Apparently, the described embodiments are some of the embodiments of the disclosure rather than all embodiments. Based on the embodiments in the disclosure, all other embodiments obtained by those skilled in the art without creative work fall within the scope of protection of the disclosure.

The disclosure provides a high-efficiency cultivation method suitable for high-frequency drip irrigation, water saving, seedling strengthening and yield increase of cotton fields in saline-alkali soil, which realizes the cultivation process of saving water, high emergence rate, high survival rate of seedlings (also referred to as seedling protection rate), high seedling strengthen rate and high yield of cotton planting in saline-alkali soil. The specific cultivation method is as follows.

(1) Soil Selection

Light and moderate saline-alkali soil (also referred to as saline-alkali land) is selected, the saline-alkali content is less than or equal to 5‰, the organic matter is more than or equal to 1‰, and the soil texture type is not limited.

(2) Land Preparation

Before plowing or sowing, base fertilizer is deeply applied per mu (fifteen mu is equal to one hectare): 15 kilograms (kg) of diamine, 10-12 kg of calcium triple superphosphate, and 1 kg of zinc fertilizer as micronutrient fertilizer per three years. A plow depth is greater than 28 centimeters (cm) every year, harrowing and grinding are carried out at proper time after plowing, and land leveling is carried out using frame leveling machine. In addition to meeting the standard of "flat, broken, clean and neat", the quality of land preparation shall also highlight the standard of "solid" to prevent the cotton seeds from being misplaced and waiting for sowing when the soil is too loose. A depth of subsoiling requires 35-50 cm, once every 3-5 years.

(3) Variety Selection

An excellent variety with strong (resistance) saline-alkali resistance is selected, and it is required that the variety has good stress resistance, blight resistance and verticillium wilt resistance, good quality and high yield. The germination rate of seeds is more than 90%, and the cleanliness and purity meet the international or national seed quality standards. The growth period should meet the local climate requirements, and the seeds should be dried and coated before sowing.

(4) Spraying Herbicide before Sowing

Before sowing, the herbicide is sprayed to control weeds with 33% pendimethalin emulsifiable concentrate (abbreviated as pendimethalin EC, also referred to as pendimethalin oil) 150-200 g/mu. After application, the soil is mixed by shallow harrowing for 3 cm, and the soil is sealed with films.

(5) Rational Early Sowing

When the soil temperature of 5 cm under the film is stable above 12 Celsius degree (° C.) for more than 3 days, the sowing shall be started, and the suitable best sowing period is selected according to the local climate conditions.

(6) Sowing Method

The cotton mulching and sowing all-in-one machine is used to complete operations such as drip irrigation capillary tube laying, mulching (also referred to as film laying), sowing, soil covering and the like at one time. The hole seeder of the machine in the shape of a cross with a small-pointed mouth. The mulch film with the thickness of 0.01 millimeter (mm) and the width of 2.05 meter (m) is selected, and precision seeding (one seed per hole) is performed on the film with 1.5 and 2 kg of seeds per mu. The sowing depth is in a range of 1.5-2.0 cm. Planting mode includes: 6 rows per film, one plant per hole, spacing configuration with a wide row spacing 63 cm and a narrow row spacing 13 cm, or a wide row spacing 64 cm and a narrow row spacing 12 cm, and 9.5-10 cm of a hole spacing within each row. Tube laying method is as follows: drip irrigation capillary tubes are laid under the film with three drip irrigation capillary tubes per film, and the quality of drip irrigation capillary tubes and enough water are ensured. Each drip irrigation capillary tube should be laid in the middle of two rows of seed rows, and the dripper of the drip irrigation capillary tube directly faces the center. If the dripper is disposed on one side, the dripper faces downward and faces the outer row, if the dripper is in the middle, the dripper faces upward, or the drip irrigation capillary tube is laid beside the inner row of two rows of seed rows and the dripper faces downward and faces the outer row with a distance of 7 cm from the inner row and within 20 cm from the outer row. The soil covering mode can be selected as front sealing soil or side sealing soil. The thickness of the front sealing soil of the seedling row on the film is 1-1.5 cm, and the width is 3-5 cm. The height of the side sealing soil is 5 cm, when the height of the seedling is about 5 cm, the soil is sealed again manually or mechanically. It is required to seal the soil directly against the seedlings within one day, the thickness of the seedling sealing soil on the film is 1-1.5 cm, and the width is 3-5 cm.

(7) High-Frequency Drip Irrigation with Water for Seedling Emergence

After harvesting and before sowing of seeds, there is no irrigation. The water for seedling emergence is dripped once within 48 hours after sowing, rainy weather is avoided, and the water volume is 10-20 $m^3$/mu. There is water in each seed hole, and the water in two adjacent seed holes is just communicated, and the water is stopped immediately. If there is saline-alkali return phenomenon in the seed hole after 5-6 days of the drip irrigation, the water for seedling emergence is dripped again with the water volume of 10-20 $m^3$/mu, and the seedlings are to be emerged.

(8) High-Frequency Drip Irrigation for Survival of Seedlings 5-7 days after the emergence of seedlings, the water for the survival of seedlings is dripped once with the water volume of 10-15 $m^3$/mu. After another 5-7 days, the water is dripped again with the water volume of 10-15 $m^3$/mu. The water volume can be increased and drip irrigation times can be increased 1-2 times according to the specific situation, until the water irrigation is prepared in early June.

(9) Fertilization with Water 3-5 kg/mu of saline-alkali soil amendment (also referred to as saline-alkali improver) is added when the water for seedling emergence is dripped for 1-2 times. 3-5 kg/mu of the saline-alkali soil amendment is added each time when the water for survival of seedlings is dripped for 2-3 times, 0.5-2 kg/mu of potassium dihydrogen phosphate and 100-200 g/mu of zinc fertilizer are added for the first time of dripping the water for survival of seedlings. Specifically, the saline-alkali soil amendment is at least one of Jiandifeng compound fertilizer, humic acid soil amendment, and Feidigai compound fertilizer.

(10) Intertillage

The intertillage is carried out after the seedling rows are presented, and the intertillage is also carried out timely after rain and at low temperature. The intertillage is carried out 3-4 times after sowing and before budding, with a depth of 10-22 cm. In order to prevent damaging the straight drip irrigation tubes, the anti-pressure arched steel plate can be carried with the machine. The first tillage depth is 10-12 cm, and the seedling protection zone is 10 cm. After that, the tillage depth is increased by 3-5 cm each time, and when it is increased to 22 cm, it is not increased any more. The seedling protection zone is kept at about 8 cm. Generally, 4-5 times of intertillage should be carried out.

(11) Chemical Control

The first chemical control is carried out after the cotton seedlings are exposed and the soil is sealed, so as to prevent high seedlings. According to the variety characteristics and weather, 0.5-1 g/mu of mepiquat chloride is sprayed. The second chemical control is carried out at the three-leaf stage of the cotton seedlings by spraying 1-2 g/mu of mepiquat chloride. The third chemical control is carried out according to the growth condition of cotton seedlings after the cotton seedlings entered the bud stage by spraying 3-5 g/mu of mepiquat chloride.

(12) Green Prevention and Control of Diseases, Pests and Weeds

The diseases, pests and weeds are preliminarily prevented and controlled in a green prevention and control mode such as timely blocking the edge of the field before sowing, drying and coating seeds, spraying the soil with herbicides to fully protect predatory natural enemies, hanging yellow sticky cards, blue sticky cards, insecticidal lamps, and syrup bottles, and pulling weeds manually and other green prevention and control methods.

At the beginning of June, cotton is carried out water irrigation after budding. The water irrigation and subsequent management measures are managed according to conventional high-yield cultivation techniques.

Through the method described in the disclosure, planting early-middle maturity upland cotton varieties in saline-alkali cotton regions of Xinjiang can save water by more than 10%, improve the seedling emergence rate by 10-15%, and improve the seedling survival rate by more than 13%. After the management of conventional high-yield cultivation techniques in the middle and late stages, the number of harvested plants reaches 12-13000, the number of bolls per plant reaches 6-8, the single boll weight is 5-5.5 g, and the yield of seed cotton reaches 310-480 kg/mu.

The humic acid soil amendment used in the disclosure is fulvic acid potassium, for example.

The Jiandifeng compound fertilizer used in the following embodiments is purchased from Xinjiang Jukang Kuitun Fertilizer Co., Ltd.

The irrigation fertilizer used in the following embodiments is purchased from Xinjiang Century Zhongke Agriculture Co., Ltd.

Embodiment 1

In 2021, it was carried out in the eastern wasteland of Ninth Company of the Forty-fourth Regiment of the Third Division of the Xinjiang Construction Corps, China, covering an area of 200 mu. The fore crops were cotton, the soil texture was sandy saline-alkali soil, no irrigation before sowing, and 15 kg of diamine and 10 kg of calcium triple superphosphate per mu. The plow depth was 28 cm, harrowing and grinding are carried out at proper time after plowing, and land leveling was carried out using frame leveling machine, so as to achieve the quality of "flat, broken, clean, neat and solid". The subsoiling was carried out in the previous year with the depth of 40 cm. The cotton variety was Xinluzhong 87 (Chinese Library Classification No. S562), and the seeds were dried for half an hour and then coated. Before sowing, 200 g of 33% pendimethalin EC are used per mu. After application, the soil is mixed by shallow harrowing for 3 cm. Sowing was carried out on Apr. 10, 2021, the cotton mulching and sowing all-in-one machine is used to complete operations such as drip irrigation capillary tube laying, mulching, sowing, soil covering and the like at one time. The hole seeder of the machine in the shape of a cross with a small-pointed mouth. The mulch film had the thickness of 0.012 mm and the width of 2.05 m, and the precision seeding (one seed per hole) was performed on the film with 1.8 kg of cotton seeds per mu. The sowing depth is 1.5 cm. One film had 6 rows, spacing configuration with a wide row spacing 64 cm and a narrow row spacing 12 cm, and 9.5 cm of a hole spacing within each row. Drip irrigation capillary tubes were laid under the film with three drip irrigation capillary tubes per film. Each drip irrigation capillary tube was laid in the middle of two rows of seed rows, and the dripper of the drip irrigation capillary tube directly faces the center. The soil was sealed by front sealing soil with a thickness of 1.5 cm. On Apr. 12, 2021, 15 $m^3$/mu of water for seedling emergence was dripped, and 5 kg/mu of Jiandifeng compound fertilizer was added. On Apr. 18, 2021, 10 $m^3$/mu of water for seedling emergence was dripped, and 3 kg/mu of Jiandifeng compound fertilizer was added. On Apr. 28, 2021, 15 $m^3$/mu of water for survival of seedlings was dripped, 3 kg/mu of Jiandifeng compound fertilizer was added, 1 kg/mu of potassium dihydrogen phosphate was added, and 100 g/mu of zinc fertilizer was added. On May 10, 2021, 10 $m^3$/mu of water for survival of seedlings was dripped, and 3 kg/mu of Jiandifeng compound fertilizer was added. On May 18, 2021, 10 $m^3$/mu of water for survival of seedlings was dripped, and 3 kg/mu of Jiandifeng compound fertilizer was added. On May 28, 2021, water irrigation was carried out, and the seedling survival rate was 86%, the drip water volume was 25 $m^3$/mu, the drip urea was 1.7 kg/mu, and the drip irrigation fertilizer was 1.0 kg/mu. After that, water was dripped every 8 days, and 2.5-5 kg/mu of urea and 1.5-2 kg/mu of drip irrigation fertilizer were dripped in each watering. The total water consumption is 395 $m^3$/mu. On Apr. 20, 2021, the first time of intertillage was carried out after the seedling rows were presented, with a tillage depth of 12 cm and a seedling protection zone of 10 cm. On May 10, 2021, two times of intertillage were carried out with a tillage depth of 15 cm and a seedling protection zone of 8 cm. On May 20, 2021, three times of intertillage were carried out with a tillage depth of 18 cm and a seedling protection zone of 8 cm. On Apr. 20, 2021, the first chemical control was carried out after the cotton seedlings were exposed and the soil was sealed, and 0.5 g/mu of mepiquat chloride was sprayed. The second chemical control was carried out at the three-leaf stage of the cotton seedlings by spraying 1.5 g/mu of mepiquat chloride. The third chemical control was carried out after the cotton seedlings entered the bud stage by spraying 5 g/mu of mepiquat chloride. On Jul. 10, 2021, at the time of 8-9 fruit branches, artificial detopping was carried out. On Sep. 12, 2021, defoliant was sprayed by the machine with 70 g/mu of 40% ethrel and 20 g/mu of 80% Ruituolong®. On Oct. 30, 2021, machine picking was carried out. After harvest, the yield of seed cotton per mu is 467 kg. Compared with the conventional management mode of the same land, the water consumption of the control cotton field was 550 $m^3$/mu, the seedling survival rate was 71%, and the yield of seed cotton is 325 kg/mu. The method of the disclosure saved 155 $m^3$/mu of water for cotton plantation, increased the seedling survival rate by 15%, and increased the yield of seed cotton by 142 kg/mu.

Embodiment 2

In 2021, it was carried out in the Kunagayi strip field of $19^{th}$ Company of the 51st Regiment of the Third Division of Xinjiang Construction Corps, China. The difference of the demonstration field was as follows.

It covered an area of 100 mu, Sowing was carried out on Apr. 18, 2021, the soil was sealed by side sealing soil, the soil texture was silty clay loam. On Apr. 20, 2021, 10 $m^3$/mu of water for seedling emergence was dripped, and 5 kg/mu of Jiandifeng compound fertilizer was added. On Apr. 25, 2021, 10 $m^3$/mu of water for seedling emergence was dripped. On May 2, 2021, 10 $m^3$/mu of water for survival of seedlings was dripped, 3 kg/mu of Jiandifeng compound fertilizer was added, 1 kg/mu of potassium dihydrogen phosphate was added, and 200 g/mu of zinc fertilizer was added. On May 10, 2021, 10 $m^3$/mu of water for survival of seedlings was dripped, and 3 kg/mu of Jiandifeng compound fertilizer was added. On May 18, 2021, 10 $m^3$/mu of water for survival of seedlings was dripped, and 3 kg/mu of Jiandifeng compound fertilizer was added. On Jun. 8, 2021, water irrigation was carried out, the seedling survival rate was 78%, the drip water volume was 25 $m^3$/mu, the drip urea was 2 kg/mu, and the drip irrigation fertilizer was 1.0 kg/mu. The total water consumption is 380 $m^3$/mu. On May 16, 2021, the soil was mechanically sealed. The first time of intertillage was carried out on May 5, 2021, the second time of intertillage was carried out on May 15, 2021, and the third time of intertillage was carried out on May 23, 2021. The chemical control of cotton seedlings was carried out at the three-leaf stage of the cotton seedlings by spraying 1.2 g/mu of mepiquat chloride, and the chemical control after budding was carried out by spraying 6 g/mu of paraquat. On Jul. 15, 2021, at the time of 8-9 fruit branches, artificial detopping was carried out. On Sep. 18, 2021, defoliant was sprayed by the machine. On Nov. 18, 2021, machine picking was carried out. After harvest, the yield of seed cotton per mu is 312 kg. Compared with the conventional management mode of the same land, the water consumption of the control cotton field is 530 $m^3$/mu, the seedling survival rate is 65%, and the yield of seed cotton is 283 kg/mu. The method of the disclosure saved 150 m³/mu of water for cotton plantation, increased the seedling survival rate by 13%, and increases the yield of seed cotton by 29 kg/mu.

Finally, it should be noted that the above embodiments are only used to illustrate the technical solutions of the disclosure, not to limit it. Although the disclosure has been described in detail with reference to the foregoing embodiments, those skilled in the art should understand that the technical solutions described in the foregoing embodiments can still be modified, or some of the technical features thereof can be equivalently replaced. However, these modifications or replacements do not make the essence of the corresponding technical solutions deviate from the spirit and scope of the technical solutions of the embodiments of the disclosure.

What is claimed is:

1. A cultivation method for drip irrigation of cotton fields in saline-alkali soil, comprising the following steps:
    (1) performing land preparation, comprising: plowing the soil with a plow depth being greater than 28 centimeters (cm), and performing subsoiling with a subsoiling depth being required to be in a range of 35-50 cm;
    (2) laying a film with a thickness of 0.01 millimeters (mm), setting 6 seed rows per film, one seed per hole; spacing configuration with a wide row spacing 63 cm and a narrow row spacing 13 cm, or a wide row spacing 64 cm and a narrow row spacing 12 cm; and 9.5-10 cm of a hole spacing within each of the seed rows;
    (3) laying drip irrigation capillary tubes, comprising: laying the drip irrigation capillary tubes under the film with three drip irrigation capillary tubes per film, and each of the drip irrigation capillary tubes being laid in a middle of two rows of the seed rows; wherein when a dripper of the drip irrigation capillary tube is disposed on one side of the drip irrigation capillary tube, the dripper faces downward and faces an outer row of the two rows of the seed rows; and when the dripper is disposed at a middle of the drip irrigation capillary tube, the dripper faces upward, or the drip irrigation capillary tube is laid beside to an inner row of the two rows of the seed rows and the dripper faces downward and faces an outer row of the two rows of the seed rows with a distance from the inner row of 7 cm and within 20 cm from the outer row;
    (4) performing a drip irrigation mode, comprising: dripping water for seedling emergence once within 48 hours after sowing under a condition of avoiding rainy weather with no irrigation and no ridges of field before sowing, wherein a water volume is in a range of 10-15 m³/mu and there is water in each seed hole, stopping drip irrigation immediately when the water in the two adjacent seed holes is just communicated; dripping the water for seedling emergence again in the seed holes after 5-6 days of the dripping water for seedling emergence once within 48 hours after sowing, with a water volume of 10-20 m³/mu, and waiting for seedling emergence; dripping water for seedling survival once 5-7 days after the seedling emergence with a water volume of 10-15 m³/mu; dripping the water for seedling survival again after another 5-7 days with a water volume of 10-15 m³/mu, wherein the water volume is increased and times of the dripping is increased 1-2 times, until water irrigation is prepared in early June;
    (5) fertilizing with water, comprising: adding 3-5 kg/mu of a saline-alkali soil amendment every time when dripping the water for seedling emergence, adding 3-5 kg/mu of the saline-alkali soil amendment for a first time of dripping the water for seedling survival with adding 0.5-2 kg/mu of potassium dihydrogen phosphate and 100-200 g/mu of zinc fertilizer, and adding 3-5 kg/mu of the saline-alkali soil amendment every time after the first time of dripping the water for seedling survival; wherein the saline-alkali soil amendment is humic acid soil amendment; and
    (6) performing intertillage, comprising: performing the intertillage once after seedling rows are presented, and performing the intertillage after rain and at low temperature, wherein 3-4 times of the intertillage are performed after the sowing and before budding, with a depth of 10-22 cm, and an anti-pressure arched steel plate is carried with an intertillage vehicle to prevent damaging the drip irrigation capillary tubes;
    wherein the method further comprises:
    performing a first chemical control after cotton seedlings are exposed and the soil is sealed by spraying 0.5-1 g/mu of mepiquat chloride; performing a second chemical control at a three-leaf stage of the cotton seedlings by spraying 1-2 g/mu of mepiquat chloride; and performing a third chemical control according to a growth condition of the cotton seedlings after the cotton seedlings entered a bud stage by spraying 3-5 g/mu of mepiquat chloride;
    wherein green prevention and control before the water irrigation is a main task, and specific operations of the green prevention and control of diseases, pests and weeds are as follows:
    blocking timely an edge of field before sowing, drying and coating seeds, spraying the soil with herbicides to protect predatory natural enemies, hanging yellow sticky cards, blue sticky cards, insecticidal lamps, and syrup bottles, and pulling weeds manually to preliminarily control the diseases, the pests and the weeds;
    wherein specific operations of the intertillage comprises:
    a tillage depth of a first intertillage is in a range of 10-12 cm, and a seedling protection zone is 10 cm; after the first intertillage, the tillage depth is increased by 3-5 cm each time until the tillage depth is increased to 22 cm, the seedling protection zone is kept at 8 cm; and 4-5 times of the intertillage are carried out.

2. The method according to claim 1, wherein a width of the film is 2.05 meters (m), six rows of seeds are sown, an average row spacing of the seed rows is 38 cm, a cotton hole spacing is in a range of 9.5-10 cm, precision seeding is performed with one seed per hole, and one seedling per hole.

3. The method according to claim 1, wherein an amount of the potassium dihydrogen phosphate is 1 kg/mu, and an amount of the zinc fertilizer is 200 g/mu.

* * * * *